United States Patent
Parab

(10) Patent No.: US 8,694,469 B2
(45) Date of Patent: Apr. 8, 2014

(54) CLOUD SYNTHETIC BACKUPS

(75) Inventor: Nitin Parab, Menlo Park, CA (US)

(73) Assignee: Riverbed Technology, Inc., San Francisco, CA (US)

( * ) Notice: Subject to any disclaimer, the term of this patent is extended or adjusted under 35 U.S.C. 154(b) by 115 days.

(21) Appl. No.: 12/895,811

(22) Filed: Sep. 30, 2010

(65) Prior Publication Data

US 2011/0161297 A1 Jun. 30, 2011

Related U.S. Application Data

(60) Provisional application No. 61/290,334, filed on Dec. 28, 2009, provisional application No. 61/315,392, filed on Mar. 18, 2010.

(51) Int. Cl.
*G06F 7/00* (2006.01)
*G06F 17/00* (2006.01)

(52) U.S. Cl.
USPC .................... 707/640; 707/661; 707/999.204

(58) Field of Classification Search
None
See application file for complete search history.

(56) References Cited

U.S. PATENT DOCUMENTS

| | | | |
|---|---|---|---|
| 2009/0182789 A1* | 7/2009 | Sandorfi et al. | 707/204 |
| 2009/0204650 A1* | 8/2009 | Wong et al. | 707/204 |
| 2010/0198797 A1* | 8/2010 | Wideman | 707/692 |
| 2011/0055471 A1* | 3/2011 | Thatcher et al. | 711/114 |

* cited by examiner

*Primary Examiner* — Azam Cheema
(74) *Attorney, Agent, or Firm* — Park, Vaughan, Fleming & Dowler LLP

(57) ABSTRACT

Synthetic backups are created without accessing previous backup data or retrieving backup data from a cloud storage service. A backup system provides two or more backup data sets to a cloud spanning storage interface for storage in deduplicated form as label maps and data segments in a cloud storage service. A specification defines portions of two or more previous backup data sets to be copied into the synthetic backup. Labels corresponding with the specified portions of previous backup data sets are identified and added to a new label map to create a deduplicated synthetic backup. The completed label map is transferred to the cloud storage service. To provide access to the synthetic backup, the cloud spanning storage interface reconstructs all or a portion of the synthetic backup from the new label map and the data segments created during deduplication of previous backup data sets.

15 Claims, 8 Drawing Sheets

CLOUD SYNTHETIC BACKUPS

CROSS-REFERENCE TO RELATED APPLICATIONS

This application is related to U.S. Patent Application No. 61/290,334, filed Dec. 28, 2009 and entitled "DEDUPLICATED OBJECT STORAGE SYSTEM AND APPLICATIONS," and U.S. Provisional Patent Application No. 61/315,392, filed Mar. 18, 2010 and entitled "WAN-OPTIMIZED LOCAL AND CLOUD SPANNING DEDUPLICATED STORAGE SYSTEM," which is incorporated by reference herein for all purposes. This application is related to U.S. patent application Ser. No. 12/895,835, filed Sep. 30, 2010 and entitled "CLOUD-BASED DISASTER RECOVERY," which is incorporated by reference herein for all purposes.

BACKGROUND OF THE INVENTION

The present invention relates generally to data storage systems, and systems and methods to improve storage efficiency, compactness, performance, reliability, and compatibility. Many data storage systems are tasked with handling enormous amounts of data. To protect their data, many organizations use backup systems to store multiple copies of important data on-site and/or off-site. Backup systems can create multiple backup data sets and/or snapshots, enabling organizations to maintain copies of their data at different time periods or instances. Backup systems can also create incremental backups, which record changes in an organization's data subsequent to a previous full or incremental backup data set.

Organizations often prefer to store at least some backup data sets at a different location than their primary data center. This protects the organization's data from accidents or disasters occurring at the primary data center. However, maintaining computers and data storage at multiple locations is expensive and time-consuming. As an alternative, many organizations rely on a third-party to provide off-site data storage. Cloud storage services are one type of off-site data storage. Cloud storage services are data storage services available via a wide-area network. Cloud storage services provide storage to users in the form of a virtualized storage device available via the Internet. In general, users access cloud storage to store and retrieve data using web services protocols, such as REST or SOAP.

Cloud storage service providers manage the operation and maintenance of the physical data storage devices. Users of cloud storage can avoid the initial and ongoing costs associated with buying and maintaining storage devices. Cloud storage services typically charge users for consumption of storage resources, such as storage space and/or transfer bandwidth, on a marginal or subscription basis, with little or no upfront costs. In addition to the cost and administrative advantages, cloud storage services often provide dynamically scalable capacity to meet its users changing needs.

Despite the cost and administrative advantages of cloud storage services, integrating cloud storage services with backup systems can be challenging. First, many backup systems require a specialized backup server at each backup site to store and maintain backup data sets. However, cloud storage services often only provide a virtualized data storage device to their users. Adding and maintaining a backup server at the cloud storage site, for example as a physical server or within a virtual machine, increases the cost and complexity of the cloud storage of the cloud storage service. Additionally, because the wide-area network typically has much lower bandwidth and higher latency than local-area networks, access to backup data sets in the cloud storage service is much slower. This can make some operations too slow to be practical. For example, using cloud storage services to create a synthetic backup, which is a complete backup data set created by copying data from two or more previous backup data sets, including at least one incremental backup data set, is extremely slow due to the performance of the wide-area network.

BRIEF DESCRIPTION OF THE DRAWINGS

The invention will be described with reference to the drawings, in which.

SUMMARY

A synthetic backup is a complete backup data set created by copying portions of data from two or more previous backup data sets, including one full backup data set followed by one or more incremental backup data set. An embodiment of the invention can efficiently create synthetic backups from previously created backup data sets stored locally within a cloud data storage without accessing backup data, retrieving backup data from the cloud storage service, transferring additional backup data to the cloud storage service, or requiring extensive data processing at the cloud storage service.

In an embodiment, a backup system provides a cloud spanning storage interface with two or more backup data sets, including at least one full backup data set. The cloud spanning storage interface performs data deduplication and stores the backup data sets in deduplicated form as label maps and data segments in a cloud storage service. To create a synthetic backup, an embodiment of the invention receives a specification from a backup system of portions of two or more previous backup data sets to be copied into the synthetic backup. The embodiment of the invention identifies labels corresponding with the specified portions of the previous backup data sets based on the locations in the backup data sets of the specified portions. The embodiment of the invention adds the identified labels to a new label map representing a deduplicated version of the synthetic backup. The completed new label map is then transferred to the cloud storage service.

An embodiment of the invention provides a data stream identifier and/or a shell file in file system to the backup system that represents the synthetic backup. The backup system can access all or a portion of a synthetic backup via the data stream identifier or shell file, with the cloud spanning storage interface reconstructing all or a portion of the synthetic backup from the new label map and the data segments created during deduplication of previous backup data sets.

In an embodiment, the new label map representing the deduplicated version of the synthetic backup may include indicators of partial data segments. These indicators exclude portions at the beginning and/or end of data segments from the synthetic backup.

DETAILED DESCRIPTION

Figure 1:
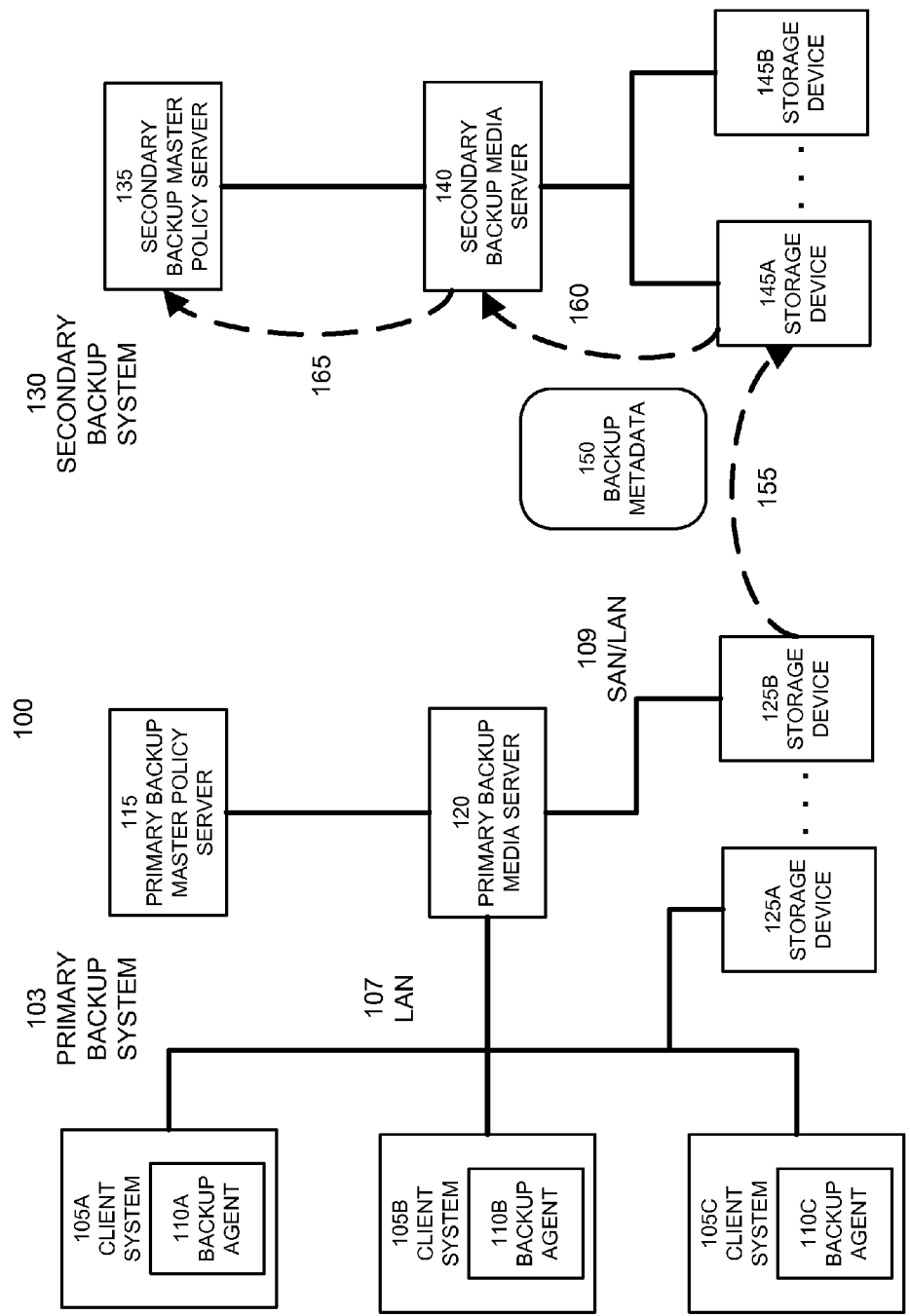
FIG. 1 illustrates a typical prior redundant backup system.

FIG. 1 illustrates a typical prior redundant backup system 100. Redundant backup system 100 includes a primary backup system 103, which may be located at an organization's data center. Primary backup system 103 supports one or more client systems 105, such as client systems 105a, 105b, and 105c. Client systems 105 can include personal computers, application server computers, database servers, or any other type of device or computer system storing data in an organization. The client systems 105 each include backup agent applications 110 that supervise the transfer of data from the client systems 105 during data backups and to the client systems 105 when restoring data from a data backup.

Primary backup system 103 includes a backup master policy server 115. Backup master policy server 115 initiates data backups according to policies and/or commands provided by system administrators. Backup master policy server 115 may initiate full or incremental data backups from one or more client systems 105. Full data backups copy all or a specified portion of the data of one or more client systems 105. Incremental data backups copy only the portion of data from a data set that has changed since a previously completed full or incremental data backup.

Backup master policy server 115 maintains backup metadata describing the contents of each data backup. Backup metadata can include the source of the data in the data backup, the time and data of the data backup, and, if the data backup is an incremental backup, the dependencies of the data backup on previously completed data backups. In general, backup metadata instructs the primary backup system 103, or any other backup system, how to use one or more backup data sets to restore data on one or more client systems 105. Without backup metadata, the backup data sets cannot be used.

The primary backup system 103 also includes a backup media server 120. Backup media server 120 is adapted to receive data from one or more client systems 105 during one or more data backups, assemble the received data into one or more data backup files or backup data streams, and transfer the assembled data backup to one or more data storage devices 125, such as local data storage devices 125a and 125b. Local data storage devices 125 can include file servers, block-based storage devices, and storage array networks. The backup media server 120 may access data storage devices 125 using one or more file system protocols, such as CIFS or NFS, or block-based storage protocols, such as iSCSI or iFCP.

The primary backup system 103 may include one or more local-area networks, such as LAN 107, for facilitating communications between client systems 105, the backup master policy server 115, and the backup media server 120. Additionally, LAN 107 may connect the backup media server 120 with one or more of the storage devices 125. Optionally, a separate storage array network SAN or LAN 109 may connect the backup media server 120 with one or more of the storage devices 125.

To protect data against accidents or disasters occurring at the location of the primary backup system 103, redundant backup system 100 includes a secondary backup system 130 at a different physical location than the primary backup system 103. Secondary backup system 130 includes a secondary backup master policy server 135, a backup media server 140, and one or more storage devices 145. Secondary backup system 130 is capable of communicating with the primary backup system via a wide-area network (WAN), such as the internet or a private WAN.

Typically, the secondary backup system 130 requires its own backup master policy server 135 and backup media server 140, because the backup master policy server 115 and backup media server 120 in the primary backup system 103 are incapable communicating with storage outside of the primary backup system location. Thus, transferring data backups from the primary backup system 103 to the secondary backup system 130 is a convoluted process.

For example, a backup data set created by the primary backup system 103 may be stored on storage device 125b. Storage device 125b initiates the copying of the backup data set to storage device 145a in the secondary backup system 130. This transfer may use one or more local-area and/or wide-area networks.

Once the backup data set has copied to one of the storage devices 145 in the secondary backup system 130, the secondary backup master policy server 135 needs to be updated with backup metadata for the copied backup data set. Typically, the secondary backup master policy server 135 is updated with backup metadata for a transferred backup data set by transferring a copy of the backup metadata 150 from the primary backup system 103 to the secondary backup system 130. For example, a copy of the backup metadata 150 for a copied backup data set is transferred from the backup master policy server 115 to the storage device 125b via the backup media server 120. The storage device 125b then transfers 155 the copy of the backup metadata to the storage device 145a. Storage device 145a transfers this copy of the backup metadata to the secondary backup master policy server 135 by transferring 160 the copy of the backup metadata 150 from the storage device 145a to the secondary backup media server 140. Then, the copy of the backup metadata 150 is transferred 165 from the secondary backup media server 140 to the secondary backup master policy server 135. The secondary backup master policy server 135 uses the copy of the backup metadata to recognize the copied data backup set and make this copied data backup set available to restore data if needed.

An embodiment of the invention eliminates the need for specialized backup servers at the secondary location, such as the secondary backup master policy server 135 and secondary backup media server 140. This enables cloud storage to be used as inexpensive and easily configured and maintained off-site data storage for backup systems.

Figure 2:
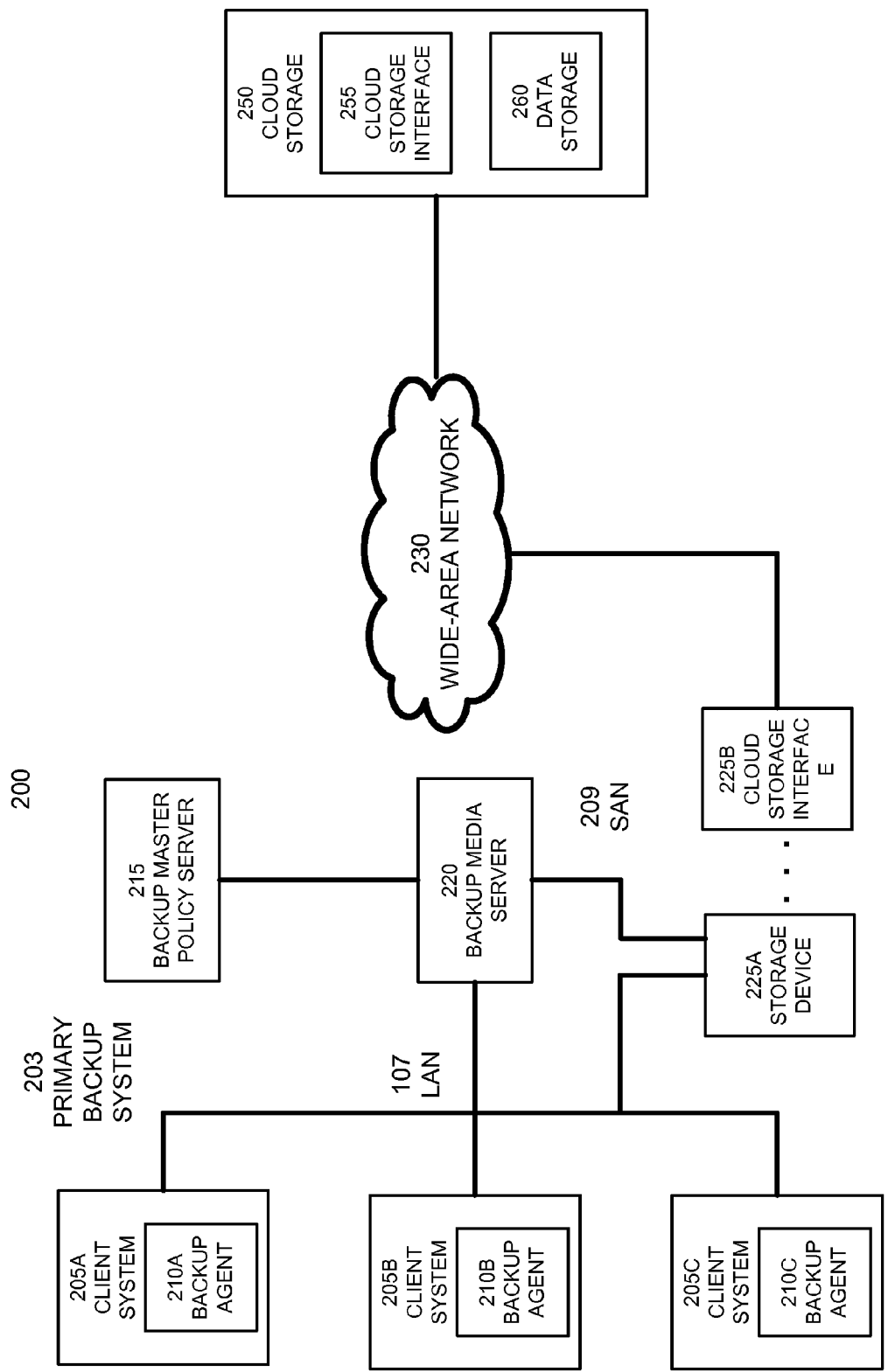
FIG. 2 illustrates a cloud backup system suitable for use with embodiments of the invention.

FIG. 2 illustrates a cloud backup system 200 suitable for use with embodiments of the invention. Cloud backup system 200 includes a primary backup system 203, similar to primary backup system 103 discussed above. Primary backup system 203 may be located at an organization's data center. Primary backup system 203 supports one or more client systems 205, such as client systems 205a, 205b, and 205c. Client systems 205 can include personal computers, application server computers, database servers, or any other type of device or computer system storing data in an organization. The client systems 205 each include backup agent applications 210 that supervise the transfer of data from the client systems 205 during data backups and to the client systems 205 when restoring data from a data backup.

Primary backup system 203 includes a backup master policy server 215. Backup master policy server 215 initiates data backups according to policies and/or commands provided by system administrators. Backup master policy server 215 may initiate full or incremental data backups from one or more client systems 205.

Backup master policy server 215 maintains backup metadata describing the contents of each data backup. Backup metadata can include the source of the data in the data backup, the time and data of the data backup, and, if the data backup is an incremental backup, the dependencies of the data backup on previously completed data backups. In general, backup metadata instructs the primary backup system 203, or any other backup system, how to use one or more backup data sets to restore data on one or more client systems 205.

The primary backup system 203 also includes a backup media server 220. Backup media server 220 is adapted to receive data from one or more client systems 205 during one or more data backups, assemble the received data into one or more data backup files or backup data streams, and transfer the assembled data backup to one or more data storage devices 225, such as a local data storage device 225a. Local data storage devices 225 can include file servers, block-based storage devices, and storage array networks. The backup media server 220 may access data storage devices 225 using one or more file system protocols, such as CIFS or NFS, or block-based storage protocols, such as iSCSI or iFCP.

The primary backup system 203 may include one or more local-area networks, such as LAN 207, for facilitating communications between client systems 205, the backup master policy server 215, and the backup media server 220. Additionally, LAN 207 may connect the backup media server 220 with one or more of the storage devices 225. Optionally, a separate storage array network SAN 209 may connect the backup media server 220 with one or more of the storage devices 225.

To protect data against accidents or disasters occurring at the location of the primary backup system 203, cloud backup system 200 includes a cloud storage service 250. Cloud storage service 250 is connected with the primary backup system 203 via a wide-area network 230, such as the internet or a private WAN. Cloud storage service 250 includes a cloud storage interface 255 and data storage 260. Cloud storage interface 255 receives data read and write requests using cloud storage protocols, for example based on web services protocols such as SOAP or REST, and performs corresponding storage operations with data storage 260.

In an embodiment, primary backup system 203 includes a cloud spanning storage interface device 225b. Cloud spanning storage interface 225b enables backup media server 220 to communicate with cloud storage service 250 as if the service 250 was a local storage device. The cloud spanning storage interface 225b stores and retrieves data from a cloud storage service 250 via wide-area network 230 using cloud storage service access protocols, such as SOAP or REST. The cloud spanning storage interface 225 may provide an interface to the backup media server 220 in the form of a file system protocol, such as CIFS or NFS, a block-based storage protocols, such as iSCSI or iFCP, or a standard or proprietary API provided by the backup media server 220. In a further embodiment, the backup media server 220 uses an API to support one or more storage plug-in software modules adapted to communicate with the cloud spanning storage interface 225b.

Embodiments of the cloud spanning storage interface 225b include a local storage cache for storing data frequently accessed by the backup media server. Embodiments of the cloud spanning storage interface 225b may use local storage to queue data that is being transferred to the cloud storage service 250 via the wide-area network. Further embodiments of the cloud spanning storage interface 225b may predict data likely to be requested by the backup media server 220 and prefetch and cache this data in local storage. In still further embodiments, the cloud spanning storage interface 225b may perform data deduplication and/or data compression to reduce the amount of data storage required to store data and to maximize the use of available bandwidth of the wide-area network 230 in transferring data between the primary backup system 203 and the cloud storage service 250.

Figure 3:
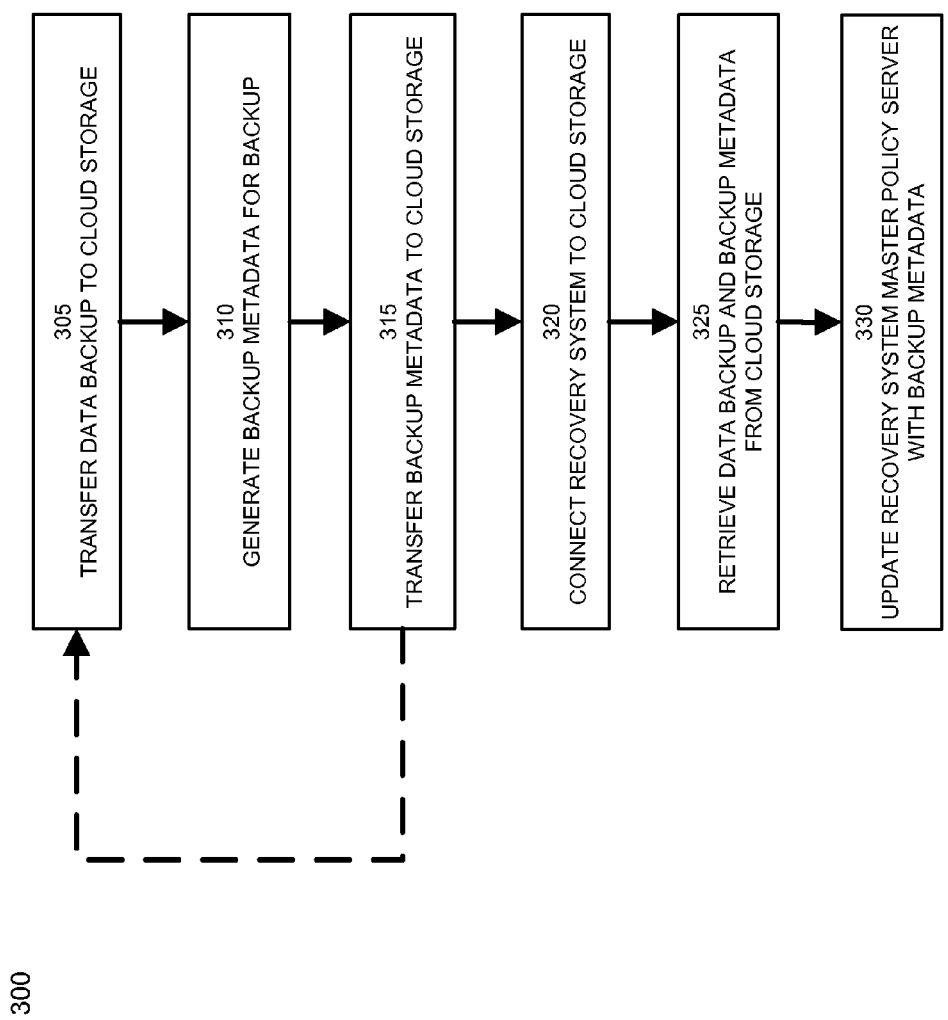
FIG. 3 illustrates a method of performing disaster recovery using a cloud backup system according to an embodiment of the invention.

As shown in FIG. 2, system 200 does not require the use of specialized backup servers at the secondary storage location, which in this example is the cloud storage service 250. FIG. 3 illustrates a method 300 of performing disaster recovery using a cloud backup system according to an embodiment of the invention.

Step 305 receives a data backup from a backup media server and transfers the data backup to a cloud storage service. The data backup may include one or more backup data files and/or one or more one or more raw streams of backup data. Step 305 may optionally maintain a local copy of some or all of the transferred data backup.

Step 310 generates backup metadata for the received data backup. Embodiments of step 310 may receive backup metadata for the received data backup from a master policy backup server in the primary backup system. Alternate embodiments of step 310 may query or access the master policy backup server or its associated data to retrieve backup metadata. In an embodiment, backup metadata is in a format adapted to be read by one or more additional master policy backup servers to recognize the copied data backup set and make this copied data backup set available to restore data if needed. For example, backup metadata may be provided in a portable data format.

Step 315 transfers the backup metadata to the cloud storage service for storage. In an embodiment, step 315 stores the backup metadata in the cloud storage separately from the data backup, such as in a different storage location or associated with a different storage identifier. In an embodiment, the backup metadata is stored in the cloud storage in a manner such that an association between the backup metadata and the data backup is apparent.

Steps 305, 310, and 315 may optionally be repeated any arbitrary number of times to transfer additional data backups and associated backup metadata from the primary backup system to the cloud storage.

If there is a need to restore data from one or more data backups using a different backup system, such as following an accident, disaster, or other catastrophic failure at the location of the primary backup system, step 320 connects a new backup system, referred to as the recovery system, to the cloud storage service. The recovery system includes a recovery master policy server, a recovery media server, and a recovery cloud spanning storage interface, similar to their counterparts in the primary backup system.

In step 325, the recovery system retrieves the backup metadata for the data backups stored in the cloud storage. In an embodiment, upon connecting with the cloud storage service, the recovery cloud spanning storage interface searches for and retrieves all of the backup metadata the cloud storage service.

Following the retrieval of the backup metadata from the cloud storage service in step 325, step 330 updates the recovery master policy server in the recovery system using the retrieved backup metadata. In an embodiment of step 330, the recovery cloud spanning storage interface provides backup metadata to the recovery master policy server in the same order that the backup metadata was created. In response to each set of backup metadata, the recovery master policy server updates its internal data structures so that it recognizes the associated data backup stored in the cloud storage service.

Following the processing of all of the backup metadata retrieved from the cloud storage service, the recovery master policy server is configured to access any of the available data backups in the cloud service. Following step 330, the recovery system may restore data from one or more data backups stored by the cloud storage service. For example, a system administrator may initiate a data recovery by selecting data to restore from a list of data backups provided by the recovery master policy server of the recovery system. The recovery master policy server can provide this list of data backups because its internal data has been configured with backup metadata as described above. In response to a selection of data to restore, the recovery media server requests the appropriate data backups from the recovery cloud spanning storage interface. The recovery cloud spanning storage interface retrieves the requested data backups from the cloud storage service. The recovery media server uses the retrieved data backups to restore the requested data.

It should be noted that there is no limit to the amount of time that may pass between the transfer of backup metadata to the cloud storage service and the updating of the recovery system with the backup metadata. Provided that backup metadata is processed in the correct order when it is eventually retrieved, backup metadata stored in the cloud storage service is still valid months or years following its creation.

The term "data deduplication" refers to some process of eliminating redundant data for the purposes of storage or communication. Data deduplicating storage typically compares incoming data with the data already stored, and only stores the portions of the incoming data that do not match data already stored in the data storage system. Data deduplicating storage maintains metadata to determine when portions of data are no longer in use by any files or other data entities.

In an optional embodiment, the cloud spanning storage interface performs data deduplication to reduce the amount of cloud storage required to store data backups, maximize data transfer performance via a wide-area network with the cloud storage service, and, as discussed in detail below, efficiently create synthetic backups from backup data stored in cloud storage services.

Figure 4:
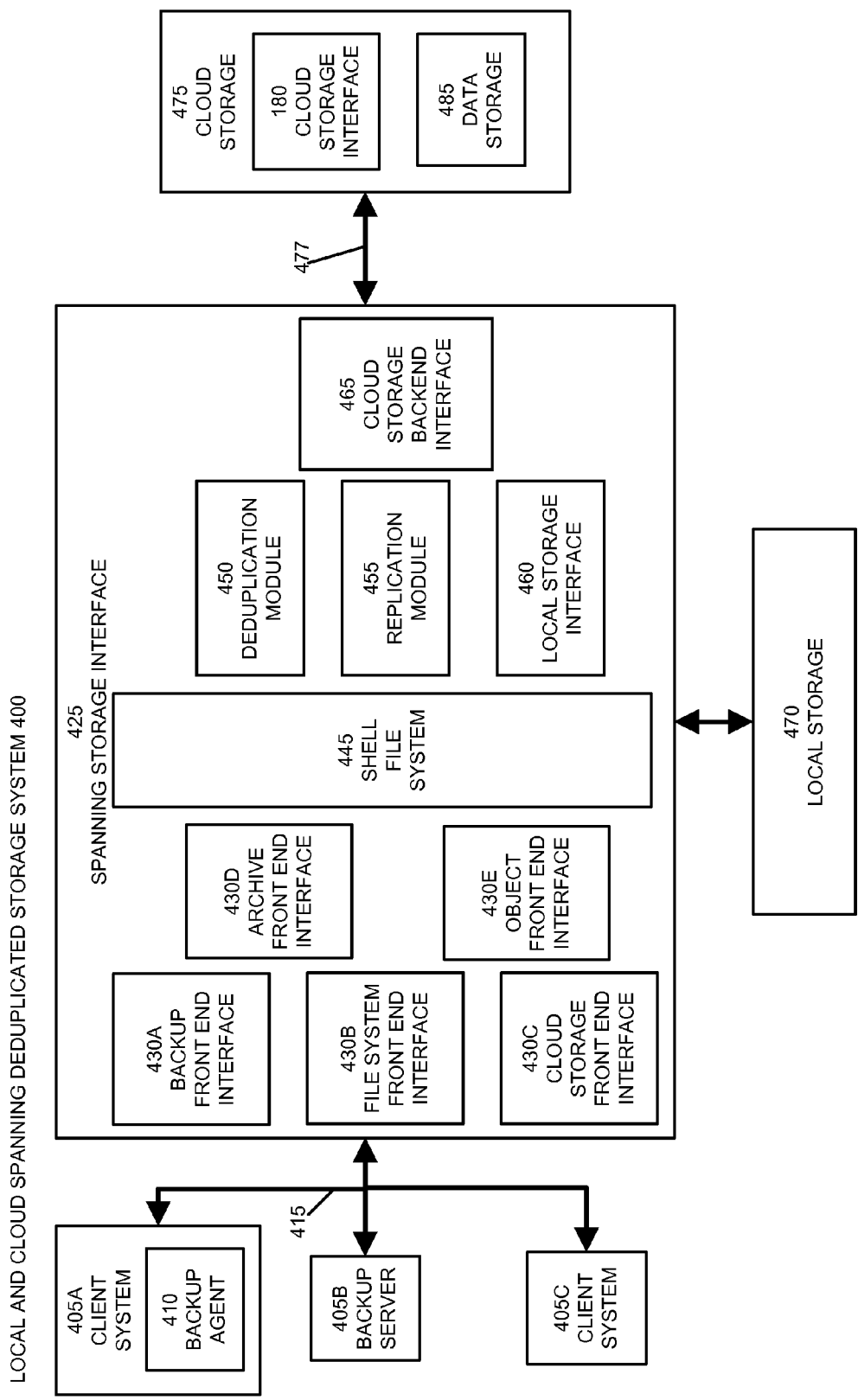
FIG. 4 illustrates an example of a deduplicating cloud-spanning storage interface suitable for use with embodiments of the invention.
Figure 5:
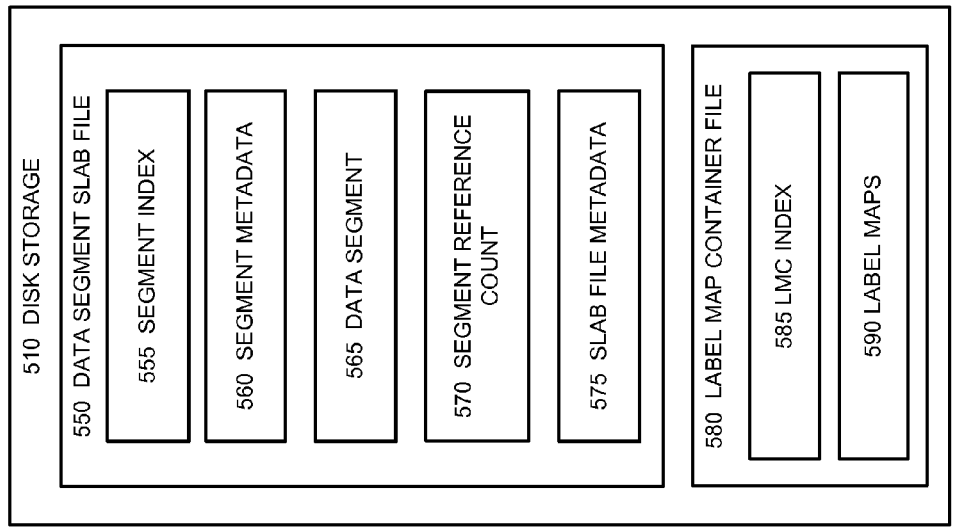
FIG. 5 illustrates example data structures used by a deduplicating cloud-spanning storage interface suitable for use with embodiments of the invention.
Figure 5:
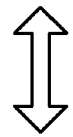
Figure 5:
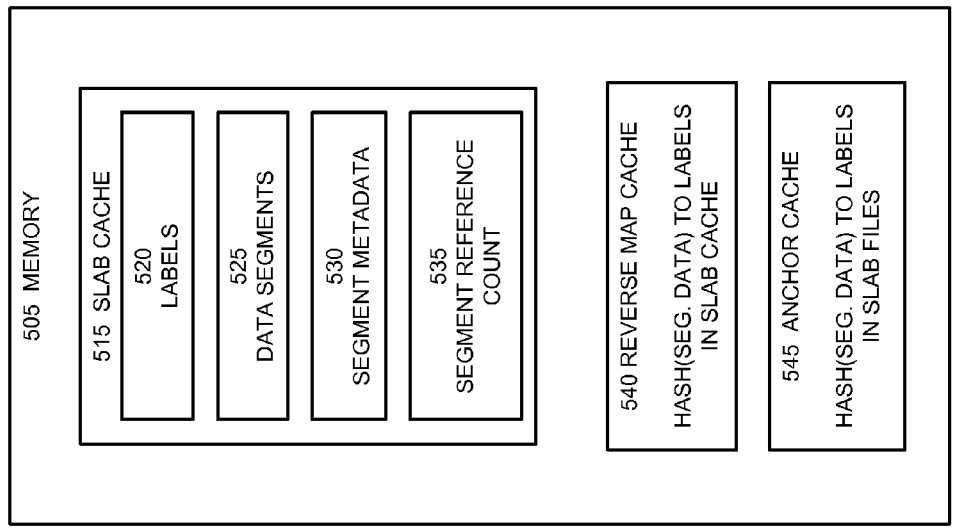

Examples of deduplicating cloud spanning storage interfaces are described in detail in U.S. Provisional Patent Application No. 61/315,392, filed Mar. 18, 2010 and entitled "WAN-OPTIMIZED LOCAL AND CLOUD SPANNING DEDUPLICATED STORAGE SYSTEM," which is incorporated by reference herein for all purposes. FIGS. 4 and 5 summarize the operation of an example cloud spanning storage interface suitable for use with embodiments of the invention.

FIG. 4 illustrates an example of cloud spanning storage interface 400 according to an embodiment of the invention. Cloud spanning storage interface 400 includes one or more client systems 405, which may include client computers, server computers, and standalone network devices. Client systems 405 are connected with a cloud spanning storage interface 425 via a local-area network and/or a storage area network 415. Cloud storage 475 is connected with the cloud spanning storage interface 425 by at least a wide-area network 477 and optionally an additional local area network. Cloud storage 475 includes a cloud storage interface 480 for communicating with the cloud spanning storage interface 425 via wide-area network 477 and at least one physical data storage device 485 for storing data.

Embodiments of cloud spanning storage interface 400 may support a variety of different storage applications using cloud data storage, including general data storage, data backup, disaster recovery, and deduplicated cloud data storage. In the case of general data storage applications, a client, such as client 405*c*, may communicate with the cloud spanning storage interface 425 via a file system protocol, such as CIFS or NFS, or a block-based storage protocol, such as iSCSI or IFCP. Data backup and disaster recovery applications may also use these protocols or specific backup and recovery protocols, such as VTL or OST. For backup applications, a client system 405*a* may include a backup agent 410 for initiating data backups. The backup agent 410 may communicate directly with the cloud spanning storage interface 425 or a backup server 405*b*, which in cloud spanning storage interface 400 is equivalent to a client. For cloud storage applications, a client 403*c* may communicate with the cloud spanning storage interface 425 via a web services protocol, such as SOAP or REST. The web services protocol may present a virtualized storage device to client 403*c*. The web services protocol used by clients 405 to communicate with the cloud spanning storage interface 425 may be the same or different than the protocol used by the cloud spanning storage interface 425 to communicate with the cloud storage 475.

Embodiments of the cloud spanning storage interface 400 may optimize data access to cloud storage 475 in a number of different ways. An embodiment of the cloud spanning storage interface 425 may present clients 405 with a file system, backup device, storage array, or other data storage interface, while transparently storing and retrieving data using the cloud storage 475 via the wide-area network 477. In a further embodiment, the cloud spanning storage interface 425 may perform data deduplication on data received from clients 405, thereby reducing the amount of storage capacity required in cloud storage 475. Additionally, because the bandwidth of the wide-area network is often limited, data deduplication by the cloud spanning storage interface 425 increases the data access performance, as perceived by the clients 425. In still a further embodiment, the cloud spanning storage interface 425 may locally cache a portion of the clients' data using local storage 470. The locally cached data may be accessed rapidly, further improving the perceived data access performance. As described in detail below, the cloud spanning storage interface 425 may use a variety of different criteria for selecting the portion of the clients' data to cache locally and may locally cache data in a deduplicated form to reduce the required capacity of local storage 475.

An embodiment of cloud spanning storage interface 425 includes one or more front end interfaces 430 for communicating with one or more client systems 405. Examples of front end interfaces 430 include a backup front end interface 430*a*, a file system front end interface 430*b*, a cloud storage front end interface 430*c*, a file archival front end interface 430*d*, and a object front end interface 430*e*. An example backup front end interface 430*a* enables backup applications, such as a backup agent 410 and/or a backup server 405*b*, to store and retrieve data to and from the cloud storage 475 using data backup and recovery protocols such as VTL or OST. In this example, the backup front end interface 430*a* allows the cloud spanning storage interface 425 and cloud storage 475 to appear to clients 405 as a backup storage device.

An example file system front end interface 430*b* enables clients 405 to store and retrieve data to and from the cloud data storage 475 using a file system protocol, such as CIFS or NFS, or a block-based storage protocol, such as iSCSI or IFCP. In this example, the file system front end interface 430*b* allows the cloud spanning storage interface 425 and cloud storage 475 to appear to clients 405 as one or more storage devices, such as a CIFS or NFS storage volume or a iSCSI or FibreChannel logical unit number (LUN).

An example cloud storage front end interface 430c enables clients 405 to store and retrieve data to and from the cloud data storage 475 using a cloud storage protocol or API. Typically, cloud storage protocols or APIs are implemented using a web services protocol, such as SOAP or REST. In this example, the cloud storage front end interface 430c allows the cloud spanning storage interface 425 and cloud storage 475 to appear to clients 405 as one or more cloud storage services. By using cloud spanning storage interface 425 to provide a cloud storage interface to clients 405, rather than letting clients 405 communicate directly with the cloud storage 475, the cloud spanning storage interface 425 may perform data deduplication, local caching, and/or translation between different cloud storage protocols.

An example file archival front end interface 430d enables clients 405 to store and retrieve file archives. Clients 405 may use the cloud spanning storage interface 425 and the cloud storage 475 to store and retrieve files or other data in one or more archive files. The file archival front end interface 430d allows clients 405 to store archive files using cloud storage 475 using archive file interfaces, rather than a cloud storage interface. Additionally, the cloud spanning storage interface 425 may perform data deduplication and local caching of the file archives.

An example object front end interface 430e enables clients to store and retrieve data in any arbitrary format, such as object formats and blobs or binary large objects. The object front end interface 430e allows clients 405 to store data in arbitrary formats, such as object formats or blobs, using cloud storage 475 using object protocols, such as object serialization or blob storage protocols, rather than a cloud storage protocol. Additionally, the cloud spanning storage interface 425 may perform data deduplication and local caching of the object or blob data.

In an embodiment, cloud spanning storage interface 425 also includes one or more shell file systems 445. Shell file system 445 includes a representation of all of the entities, such as files, directories, objects, blobs, and file archives, stored by clients 425 via the front end interfaces 430. In an embodiment, the shell file system 445 includes all of the entities stored by the clients 425 in a shell form. In this embodiment, each entity, such as a file or other entity, is a represented by a "shell" entity that does not include the data contents of the original entity. For example, a shell file in the shell file system 445 includes the same name, file path, and file metadata as the original file. However, the shell file does not include the actual file data, which is stored in the cloud storage 475. It should be noted that although the size of the shell file is less than the size of the actual stored file (in either its original or deduplicated format, an embodiment of the shell file system 445 sets the file size metadata attribute of the shell file to the size of the original file. In a further embodiment, each entity in the shell file system 445, such as a file, directory, object, blob, or file archive, may include additional metadata for use by the cloud spanning storage interface 425 to access the corresponding data from the cloud storage 475.

An embodiment of the cloud spanning storage interface 425 includes a deduplication module 450 for deduplicating data received from clients 405. Deduplication module 450 analyzes data from clients 405 and compares incoming data with previously stored data to eliminate redundant data for the purposes of storage or communication. Data deduplication reduces the amount of storage capacity used by cloud storage 475 to store clients' data. Also, because wide-area network 477 typically has bandwidth limitations, the reduction of data size due to data deduplication also reduces the amount of time required to transfer data between clients 405 and the cloud storage 475. Additionally, deduplication module 450 retrieves deduplicated data from the cloud storage 475 and converts it back to its original form for use by clients 405.

In an embodiment, deduplication module 450 performs data deduplication on incoming data and temporarily stores this deduplicated data locally, such as on local storage 470. Local storage 470 may be a physical storage device connected with or integrated within the cloud spanning storage interface 425. Local storage 470 is accessed from cloud spanning storage interface 425 by a local storage interface 460, such as an internal or external data storage interface, or via a local-area network.

In an embodiment, the cloud storage 475 includes a complete and authoritative version of the clients' data. In a further embodiment, the cloud spanning storage interface 425 may maintain local copies of some or all of the clients' data for the purpose of caching. In this embodiment, the cloud spanning storage interface 425 uses the local storage 470 to cache client data. The cloud spanning storage interface 425 may cache data in its deduplicated format to reduce local storage requirements or increase the effective cache size. In this embodiment, the cloud spanning storage interface 425 may use a variety of criteria for selecting portions of the deduplicated client data for caching. For example, if the cloud spanning storage interface 425 is used for general file storage or as a cloud storage interface, the cloud spanning storage interface may select a specific amount or percentage of the client data for local caching. In another example, the data selected for local caching may be based on usage patterns of client data, such as frequently or recently used data. Caching criteria may be based on elapsed time and/or the type of data. In another example, the cloud spanning storage interface 425 may maintain locally cached copies of the most recent data backups from clients, such as the most recent full backup and the previous week's incremental backups.

In an embodiment, replication module 455 transfers locally stored deduplicated data from the cloud spanning storage interface 425 to the cloud storage 475. Embodiments of the deduplication module and the replication module 455 may operate in parallel and/or asynchronously, so that the bandwidth limitations of wide-area network 477 do not interfere with the throughput of the deduplication module 450. The operation of embodiments of deduplication module 450 and replication module 455 are described in detail below.

An embodiment of cloud spanning storage interface 425 includes a cloud storage backend interface 465 for communicating data between the cloud spanning storage interface 425 and the cloud storage 475. Embodiments of the cloud storage backend interface 465 may use cloud storage protocols or API and/or web services protocols, such as SOAP or REST, to store and retrieve data from the cloud storage 475. In an embodiment, the replication module transfers deduplicated data from local storage 470 to cloud storage 475 using the cloud storage backend interface 465. In an embodiment, the deduplication module retrieves deduplicated data from the cloud storage 475 using the cloud storage backend interface 465.

In an embodiment, the cloud spanning storage interface 425 performs data deduplication by segmenting an incoming data stream to aid data compression. For example, segmentation may be designed to produce many identical segments when the data stream includes redundant data. Multiple instances of redundant data may be represented by referencing a single copy of this data.

Additionally, a data stream may be segmented based on data types to aid data compression, such that different data types are in different segments. Different data compression techniques may then be applied to each segment. Data compression may also determine the length of data segments. For example, data compression may be applied to a data stream until segment boundary is reached or the segment including the compressed data reaches a predetermined size, such as 4 KB. The size threshold for compressed data segments may be based on optimizing disk or data storage device access.

Regardless of the technique used to segment data in the data stream, the result is a segmented data stream having its data represented as segments. In some embodiments of the invention, data segmentation occurs in memory and the segmented data stream is not written back to data storage in this form. Each segment is associated with a label. Labels are smaller in size than the segments they represent. The segmented data stream is then replaced with deduplicated data in the form of a label map and segment storage. Label map includes a sequence of labels corresponding with the sequence of data segments identified in the segmented data stream. Segment storage includes copies of the segment labels and corresponding segment data. Using the label map and the data segment storage, a storage system can reconstruct the original data stream by matching in sequence each label in a label map with its corresponding segment data from the data segment storage.

Embodiments of the invention attempt (but do not always succeed) in assigning a single label to each unique data segment. Because the segmentation of the data stream produces many identical segments when the data stream includes redundant data, these embodiments allow a single label and one copy of the corresponding segment data to represent many instances of this segment data at multiple locations in the data stream. For example, a label map may include multiple instances of a given label at different locations. Each instance of this label represents an instance of the corresponding segment data. Because the label is smaller than the corresponding segment data, representing redundant segment data using multiple instances of the same label results in a substantial size reduction of the data stream.

FIG. 5 illustrates example data structures 500 used by a cloud spanning storage interface according to an embodiment of the invention. An embodiment of cloud spanning storage interface 500 includes both memory 505, which has high performance but relatively low capacity, and disk storage 510, which has high capacity but relatively low performance.

Memory 505 includes a slab cache data structure 515. The slab cache 515 is adapted to store a set of labels 520 and a corresponding set of data segments 525. In typical applications, the sets of labels 520 and data segments 525 stored in the slab cache 515 represent only a small fraction of the total number of data segments and labels used to represent stored data. A complete set of the labels and data segments is stored in disk storage 510.

An embodiment of the slab cache 515 also includes segment metadata 530, which specifies characteristics of the data segments 525. In an embodiment, the segment metadata 530 includes the lengths of the data segments 525; hashes or other characterizations of the contents of the data segments 525; and/or anchor indicators, which indicate whether a particular data segment has been designated as a representative example of the contents of a data segment slab file, as discussed in detail below.

An embodiment of the slab cache 515 also includes data segment reference count values. The cloud spanning storage interface 500 recognizes that some data segments are used in multiple places in one or more data streams. For at least some of the data segments, an embodiment of the cloud spanning storage interface 500 maintains counts, referred to as reference counts, of the number of times these data segments are used. As discussed in detail below, if a data stream includes a data segment previously defined, an embodiment of the cloud spanning storage interface 500 may increment the reference count value associated with this data segment. Conversely, if a data stream is deleted from the cloud spanning storage interface 500, an embodiment of the cloud spanning storage interface 500 may decrement the reference count values associated with the data segments included in the deleted data stream. If the reference count value of a data segment drops to zero, the data segment and label may be deleted and its storage space reallocated.

In addition to the slab cache 515, an embodiment of the cloud spanning storage interface 500 includes a reverse map cache 540. In an embodiment, the reverse map cache 540 maps the contents of a data segment to a label, for the labels stored in the slab cache 515. In an embodiment, a hashing or other data characterization technique is applied to segment data. The resulting value is used as an index in the reverse map cache 540 to identify an associated label in the slab cache 515. If the hash or other value derived from the segment data matches an entry in the reverse map cache 540, then this data segment has been previously defined and is stored in the slab cache 515. If the hash or other value derived from the segment data does not match any entry in the reverse map cache 540, then this data segment is not currently stored in the slab cache 515. Because the slab cache 515 only includes a portion of the total number of labels used to represent data segments, a data segment that does not match a reverse map cache entry may either have not been previously defined or may have been previously defined but not loaded into the slab cache 515.

In an embodiment, memory 505 of the cloud spanning storage interface 500 also includes an anchor cache 545. Anchor cache 545 is similar to reverse map cache 540; however, anchor cache 545 matches the contents of data segments with representative data segments in data segment slab files stored on disk storage 510. A complete set of data segments are stored in one or more data segment slab files in disk storage 510. In an embodiment, one or more representative data segments from each data segment slab file are selected by the cloud spanning storage interface 500. The cloud spanning storage interface 500 determines hash or other data characterization values for these selected representative data segments and stores these values along with data identifying the file or disk storage location including this data segment in the anchor cache 545. In an embodiment, the data identifying the file or disk storage location of a representative data segment may be its associated label. The cloud spanning storage interface 500 uses the anchor cache 545 to determine if a data segment from a data stream matches a data segment from another data stream previously stored in disk storage but not currently stored in the slab cache.

In an embodiment, potential representative data segments are identified during segmentation of a data stream. As discussed in detail below, when one or more potential representative data segments are later stored in disk storage 510, for example in a data segment slab file, an embodiment of the cloud spanning storage interface 500 selects one or more of these potential representative data segments for inclusion in the anchor cache.

A variety of criteria and types of analysis may be used alone or together in various combinations to identify representative data segments in data streams and/or in data segment slab files stored in disk storage 510. For example, the cloud spanning storage interface 500 selects the first unique data segment in a data stream as a representative data segment. In another example, the cloud spanning storage interface 500 uses the content of the data stream to identify potential representative data segments. In still another example, the cloud spanning storage interface 500 uses criteria based on metadata such as a file type, data type, or other attributes provided with a data stream to identify potential representative data segments. For example, data segments including specific sequences of data and/or located at specific locations within a data stream of a given type may be designated as representative data segments based on criteria or heuristics used by the cloud spanning storage interface 500. In a further example, a random selection of unique segments in a data stream or a data segment slab file may be designated as representative data segments. In yet a further example, representative data segments may be selected at specific locations of data segment slab files, such as the middle data segment in a slab file.

Disk storage 510 stores a complete set of data segments and associated labels used to represent all of the data streams stored by cloud spanning storage interface 500. In an embodiment, disk storage 510 may be comprised of multiple physical and/or logical storage devices. In a further embodiment, disk storage 510 may be implementing using a storage area network.

Disk storage 510 includes one or more data segment slab files 550. Each data segment slab file 550 includes a segment index 555 and a set of data segments 565. The segment index 555 specifies the location of each data segment within the data segment slab file. Data segment slab file 550 also includes segment metadata 560, similar to the segment metadata 530 discussed above. In an embodiment, segment metadata 560 in the data segment slab file 550 is a subset of the segment metadata in the slab cache 515 to improve compression performance. In this embodiment, the cloud spanning storage interface 500 may recompute or recreate the remaining metadata attribute values for data segments upon transferring data segments into the slab cache 515.

Additionally, data segment slab file 550 may include data segment reference count values 570 for some or all of the data segments 565. In an embodiment, slab file 550 may include slab file metadata 575, such as a list of data segments to be deleted from the slab file 550.

Disk storage 510 includes one or more label map container files 580. Each label map container file 580 includes one or more label maps 590. Each of the label maps 590 corresponds with all or a portion of a deduplicated data stream stored by the cloud spanning storage interface 500. Each of the label maps 590 includes a sequence of one or more labels corresponding with the sequence of data segments in all or a portion of a deduplicated data stream. In an embodiment, each label map also includes a label map table of contents providing the offset or relative position of sections of the label map sequence with respect to the original data stream. In one implementation, the label maps are compressed in sections, and the label map table of contents provides offsets or relative locations of sections of the label map sequence relative to the uncompressed data stream. The label map table of contents may be used to allow random or non-sequential access to a deduplicated data stream.

Additionally, label map container file 580 may include label map container index 585 that specifies the location of each label map within the label map container file.

In an embodiment, label names are used not only identify data segments, but also to locate data segments and their containing data segment slab files. For example, labels may be assigned to data segments during segmentation. Each label name may include a prefix portion and a suffix portion. The prefix portion of the label name may correspond with the file system path and/or file name of the data segment slab file used to store its associated segment. All of the data segments associated with the same label prefix may be stored in the same data segment slab file. The suffix portion of the label name may be used to specify the location of the data segment within its data segment slab file. The suffix portion of the label name may be used directly as an index or location value of its data segment or indirectly in conjunction with segment index data in the slab file. In this implementation, the complete label name associated with a data segment does not need to be stored in the slab file. Instead, the label name is represented implicitly by the storage location of the slab file and the data segment within the slab file. In a further embodiment, label names are assigned sequentially in one or more namespaces or sequences to facilitate this usage.

An embodiment similarly uses data stream identifiers to not only identify deduplicated data streams but to locate label maps and their containing label map containers. For example, a data stream identifier is assigned to a data stream during deduplication. Each data stream identifier name may include a prefix portion and a suffix portion. The prefix portion of the data stream identifier may correspond with the file system path and/or file name of the label map container used to store the label map representing the data stream. The suffix portion of the data stream identifier may be used to directly or indirectly specify the location of the label map within its label map container file. In a further embodiment, data stream identifiers are assigned sequentially in one or more namespaces or sequences to facilitate this usage.

Embodiments of the cloud spanning storage interface 500 may specify the sizes, location, alignment, and optionally padding of data in data segment slab files 550 and label map container files 580 to optimize the performance of disk storage 510. For example, segment reference counts are frequently updated, so these may be located at the end of the data segment slab file 550 to improve update performance. In another example, data segments may be sized and aligned according to the sizes and boundaries of clusters or blocks in the disk storage 510 to improve access performance and reduce wasted storage space.

A synthetic backup is a complete backup data set created by copying data from two or more previous backup data sets, including one full backup data set followed by one or more incremental backup data set. For example, if a complete backup data set was created on June 1 and an incremental data backup was created on June 2, a synthetic backup representing the complete backup data set on June 2 may be created by combining these two backups. The incremental data backup only includes data that has been added or changed since the complete backup data set was created. The synthetic data backup can be created by combining the contents of the incremental data backup with unchanged portions of the complete backup data set. If the synthetic backup is created from multiple incremental backups, then the synthetic backup includes the most recent version of each portion of data in the backup data, as selected from one of the backup data sets.

A cloud synthetic backup is a synthetic backup created from two or more previous backup data sets, including at least one incremental backup data set, stored in a cloud storage service. As described in detail below, an embodiment of the invention can create cloud synthetic backups without retrieving backup data from the cloud storage service or transferring additional backup data to the cloud storage service. Further embodiments of the invention may also be used to create synthetic backups from locally-stored deduplicated backup data alone or in combination with deduplicated backup data stored by a cloud storage service.

Figure 6A:
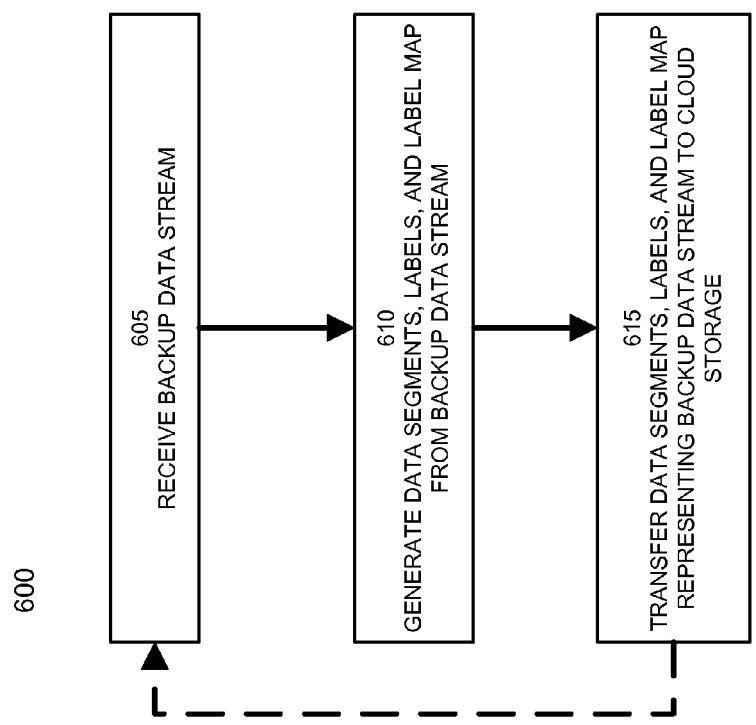
FIGS. 6A-6B illustrate a method of creating cloud synthetic backups according to an embodiment of the invention.
Figure 6B:
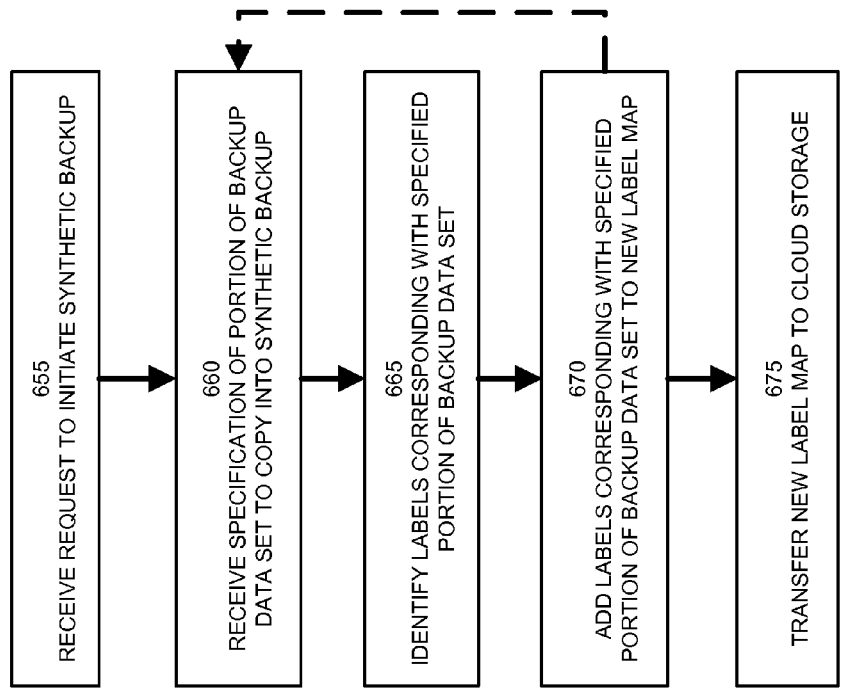

FIGS. 6A-6B illustrate a method of creating cloud synthetic backups according to an embodiment of the invention. FIG. 6A illustrates a method 600 of creating and storing full and incremental data backup sets in a cloud storage service, enabling them to be used to create cloud synthetic backups. Step 605 receives a backup data stream. The backup data stream may be a raw data stream or one or more backup data files provided by a backup media server. The backup data stream may represent a full or an incremental data backup. Step 610 performs data deduplication on the received backup data stream to create data segments, labels, and a label map corresponding with the received backup data stream. Step 615 transfers the deduplicated backup data stream, in the form of data segments, labels, and a label map to the cloud storage service. In an embodiment, step 615 may transfer the deduplicated backup data stream in the form of one or more data segment slab files and label map container files. Steps 605, 610, and 615 may be repeated for multiple full or incremental data backups created by the cloud backup system.

Following one or more iterations of steps 605, 610, and 615, the cloud storage service includes one or more backup data sets, stored in deduplicated form as data segments, labels, and label maps. These backup data sets may be used by an embodiment of the invention to create one or more synthetic backups in the cloud storage service without retrieving backup data from the cloud storage service, transferring additional backup data to the cloud storage service, or performing intensive data manipulation on data in the cloud storage service.

FIG. 6B illustrates a method 650 of creating cloud synthetic backups according to an embodiment of the invention. Step 655 receives a request to initiate a synthetic backup. The request may be received from a master policy backup server or a backup media server in response to an administrator command or in response to a policy or criteria specified by an administrator.

To generate a synthetic backup, the backup media server identifies the portions of previously created backup data sets that need to be copied to the new synthetic backup. Additionally, the backup media server identifies the locations or sequence of portions from previously created backup data sets to be copied to the new synthetic backup.

Step 660 receives a specification of a portion of a previously created backup to be copied to the new synthetic backup from the backup media server. In an embodiment, this portion to be copied is specified by identifying the previous backup data stream; the location, such as an address or offset, of the beginning of this portion; the size or ending location of this portion; and the destination location, such as an address or offset, of the portion in the synthetic backup. Alternate embodiments may specify the portion of a previously created backup to be copied to the new synthetic backup in a variety of different ways. For example, the destination location may be omitted if the backup media server specifies portions to be copied sequentially. In this example, the destination location is implicitly defined as immediately following the previously specified portion.

Step 665 identifies one or more data segments corresponding with the specified portion. In an embodiment, step 665 accesses the label map for the previously created backup data set including the specified portion. Step 665 may retrieve copies of label maps as needed from the cloud storage service or local copies of label maps after deduplicating data. In an embodiment, each label map includes metadata, such as data segment sizes or data segment locations, for each label. Thus, step 665 is able to identify a data segment corresponding with a given location in a previously generated backup data stream. Based on the starting and ending locations of the specified portion of a backup data set, step 665 can identify corresponding labels in the label map.

Step 670 adds the identified labels to a new label map representing the synthetic backup. Step 670 adds the identified labels to the new label map according to the destination location specified by the backup media server. This may require inserting the identified labels between previously added labels if the backup media server specifies an explicit destination location or appending the identified labels to the end of a sequence of previously added labels if the backup media server specifies portions sequentially.

Often, the portions of one or more previously created backup to be copied to a new synthetic backup may not correspond with the boundaries of corresponding data segments. For example, the portion of the previously created backup may have a starting address or offset after the beginning of a data segment and/or an ending address, offset or location before the end of a data segment. In this case, an embodiment of step 670 creates a label map for the synthetic backup that includes indicators specifying the use of partial data segments.

For example, a label and its optional indicators in a label map specify starting addresses or locations and/or ending addresses or locations of data to be included from their associated data segments. If a data segment is to be included in its entirety in a synthetic backup, these indicators may be omitted.

Steps 660, 665, and 670 may be repeated for an arbitrary number of iterations in response to the backup media server specifying additional portions of one or more backup data sets to be copied to the synthetic backup. Once the backup media server has specified all of the portions of one or more backup media sets to be copied to create the synthetic backup, step 675 transfers the label map representing the synthetic backup to the cloud storage.

Because this embodiment of the invention stores backup data in a segmented and deduplicated form, there is no need to directly copy or otherwise access the backup data or corresponding data segments from previously created backup data sets. Instead, the creation of the synthetic backup can be performed as a manipulation of labels and label maps.

Furthermore, because all of the previously created backup data sets have been stored in the cloud storage service, there is no need to transfer any additional backup data, apart from the new label map, to the cloud storage service. Typical label maps are several orders of magnitude smaller than the actual backup data. Thus, steps 665 through 675, including the transferring of the new label map to the cloud storage service, can be performed very quickly.

Following the completion of the deduplicated synthetic backup, an embodiment of the invention provides a data stream identifier or one or more shell files representing the deduplicated synthetic backup to the backup system and/or any other storage clients. The deduplicated synthetic backup can be accessed by the backup system via the cloud spanning storage interface in the same manner as any other backup data set. There is no additional overhead in assembling the synthetic backup from its label map and data segments as compared with any other deduplicated data stored in the cloud storage service.

Figure 7:
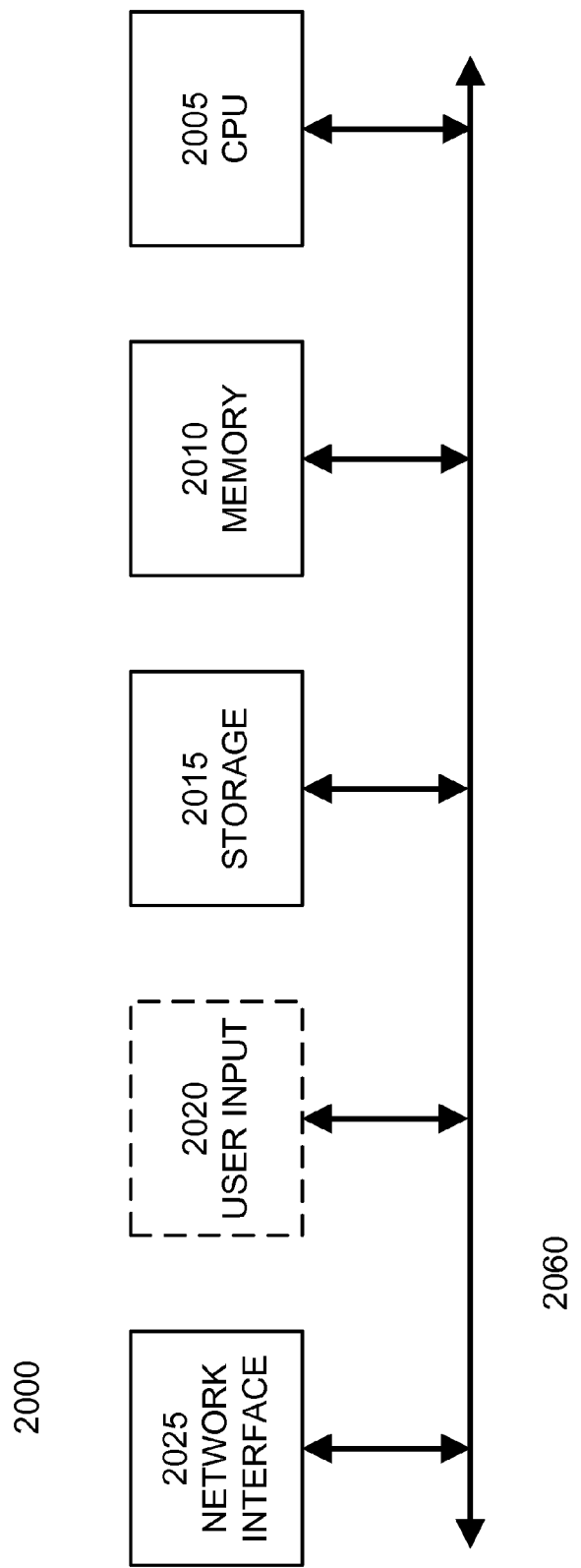
FIG. 7 illustrates a computer system suitable for implementing embodiments of the invention.

FIG. 7 illustrates a computer system suitable for implementing embodiments of the invention. FIG. 7 is a block diagram of a computer system 2000, such as a personal computer or other digital device, suitable for practicing an embodiment of the invention. Embodiments of computer system 2000 may include dedicated networking devices, such as wireless access points, network switches, hubs, routers, hardware firewalls, WAN and LAN network traffic optimizers and accelerators, network attached storage devices, storage array network interfaces, and combinations thereof.

Computer system 2000 includes a central processing unit (CPU) 2005 for running software applications and optionally an operating system. CPU 2005 may be comprised of one or more processing cores. Memory 2010 stores applications and data for use by the CPU 2005. Examples of memory 2010 include dynamic and static random access memory. Storage 2015 provides non-volatile storage for applications and data and may include fixed or removable hard disk drives, flash memory devices, ROM memory, and CD-ROM, DVD-ROM, Blu-ray, HD-DVD, or other magnetic, optical, or solid state storage devices.

In a further embodiment, CPU 2005 may execute virtual machine software applications to create one or more virtual processors capable of executing additional software applications and optional additional operating systems. Virtual machine applications can include interpreters, recompilers, and just-in-time compilers to assist in executing software applications within virtual machines. Additionally, one or more CPUs 2005 or associated processing cores can include virtualization specific hardware, such as additional register sets, memory address manipulation hardware, additional virtualization-specific processor instructions, and virtual machine state maintenance and migration hardware.

Optional user input devices 2020 communicate user inputs from one or more users to the computer system 2000, examples of which may include keyboards, mice, joysticks, digitizer tablets, touch pads, touch screens, still or video cameras, and/or microphones. In an embodiment, user input devices may be omitted and computer system 2000 may present a user interface to a user over a network, for example using a web page or network management protocol and network management software applications.

Computer system 2000 includes one or more network interfaces 2025 that allow computer system 2000 to communicate with other computer systems via an electronic communications network, and may include wired or wireless communication over local area networks and wide area networks such as the Internet. Computer system 2000 may support a variety of networking protocols at one or more levels of abstraction. For example, computer system may support networking protocols at one or more layers of the seven layer OSI network model. An embodiment of network interface 2025 includes one or more wireless network interfaces adapted to communicate with wireless clients and with other wireless networking devices using radio waves, for example using the 802.11 family of protocols, such as 802.11a, 802.11b, 802.11g, and 802.11n.

An embodiment of the computer system 2000 may also include one or more wired networking interfaces, such as one or more Ethernet connections to communicate with other networking devices via local or wide-area networks.

The components of computer system 2000, including CPU 2005, memory 2010, data storage 2015, user input devices 2020, and network interface 2025 are connected via one or more data buses 2060. Additionally, some or all of the components of computer system 2000, including CPU 2005, memory 2010, data storage 2015, user input devices 2020, and network interface 2025 may be integrated together into one or more integrated circuits or integrated circuit packages. Furthermore, some or all of the components of computer system 2000 may be implemented as application specific integrated circuits (ASICS) and/or programmable logic.

Further embodiments can be envisioned to one of ordinary skill in the art. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of generating a synthetic backup, the method comprising:
   receiving specifications of portions of previously created backup data sets to be copied to a synthetic backup; and
   for each specification,
      identifying at least one segment label in a label map corresponding with a deduplicated version of one of the previously created backup data sets,
      identifying at least one range of locations in the previously created backup data set corresponding with the portion,
      identifying at least one segment label in the label map corresponding with a data segment representing the range of locations,
      adding the identified segment labels to a new label map corresponding with a deduplicated version of the synthetic backup,
      identifying a portion of a second data segment corresponding with the range of locations,
      identifying a second segment label in the label map corresponding with the second data segment, and
      adding the second segment label and an indicator of a partial data segment to the new label map, wherein the indicator specifies that a beginning portion of the second data segment is excluded from the synthetic backup.

2. The method of claim 1, comprising:
   transferring the new label map to a cloud data storage.

3. The method of claim 1, wherein the new label map corresponding with the deduplicated version of the synthetic backup includes a first segment label referencing a first data segment associated with a deduplicated version of a first one of the previously created backup data sets.

4. The method of claim 1, wherein the new label map corresponding with the deduplicated version of the synthetic backup includes a second segment label referencing a second data segment associated with a deduplicated version of a second one of the previously created backup data sets.

5. The method of claim 1, wherein identifying at least one segment label in the label map comprises:
   identifying at least one label map corresponding with the deduplicated version of the one of the previously created backup data sets.

6. The method of claim 5, comprising:
   retrieving the identified label map from a cloud data storage.

7. The method of claim 5, comprising:
   accessing a copy of the identified label map from a cache at a first network location, wherein the identified label map is stored in a cloud data storage connected with the first network location via a wide-area network.

8. The method of claim 1, comprising:
providing a data stream identifier representing the deduplicated version of the synthetic backup to a backup system, such that the backup system is able to access the synthetic backup via the data stream identifier.

9. The method of claim 1, comprising:
creating at least one shell file in a file system, wherein the shell file represents the deduplicated version of the synthetic backup to a backup system and the backup system is able to access the synthetic backup via the shell file.

10. The method of claim 1, wherein the specifications include a first specification of a first portion of a first previously created backup data set and a second specification of a second portion of a second previously created backup data set, wherein the first backup data set is a full backup data set and the second backup data set is an incremental backup data set based on changes subsequent to the creation of the full backup data set.

11. The method of claim 10, wherein the specifications include a third specification of a third portion of a third previously created backup data set, wherein the third backup data set is based on changes subsequent to the creation of the second backup data set.

12. The method of claim 11, wherein the third backup data set includes a change to the first backup data set.

13. The method of claim 11, wherein the third backup data set includes a change to the second backup data set.

14. A method of generating a synthetic backup, the method comprising:
receiving specifications of portions of previously created backup data sets to be copied to a synthetic backup; and
for each specification,
identifying at least one segment label in a label map corresponding with a deduplicated version of one of the previously created backup data sets,
identifying at least one range of locations in the previously created backup data set corresponding with the portion,
identifying at least one segment label in the label map corresponding with a data segment representing the range of locations,
adding the identified segment labels to a new label map corresponding with a deduplicated version of the synthetic backup,
identifying a portion of a second data segment corresponding with the range of locations,
identifying a second segment label in the label map corresponding with the second data segment, and
adding the second segment label and an indicator of a partial data segment to the new label map, wherein the indicator specifies that an end portion of the second data segment is excluded from the synthetic backup.

15. A system for generating a synthetic backup, the system comprising:
a processor; and
a computer-readable storage medium storing instructions that, when executed by the processor, cause the system to perform a method, the method comprising:
receiving specifications of portions of previously created backup data sets to be copied to a synthetic backup; and
for each specification,
identifying at least one segment label in a label map corresponding with a deduplicated version of one of the previously created backup data sets,
identifying at least one range of locations in the previously created backup data set corresponding with the portion,
identifying at least one segment label in the label map corresponding with a data segment representing the range of locations,
adding the identified segment labels to a new label map corresponding with a deduplicated version of the synthetic backup,
identifying a portion of a second data segment corresponding with the range of locations,
identifying a second segment label in the label map corresponding with the second data segment, and
adding the second segment label and an indicator of a partial data segment to the new label map, wherein the indicator specifies that a beginning portion of the second data segment is excluded from the synthetic backup.

* * * * *